United States Patent
Feger et al.

(10) Patent No.: US 6,522,524 B1
(45) Date of Patent: Feb. 18, 2003

(54) CONDUCTIVE ELECTROLYTE GEL FOR HIGH VOLTAGE ELECTROLYTIC CAPACITORS

(75) Inventors: Christopher Feger, Easley, SC (US); Roland Francis Dapo, Asheville, NC (US)

(73) Assignee: Pacesetter, Inc., Sunnyvale, CA (US)

( * ) Notice: Subject to any disclaimer, the term of this patent is extended or adjusted under 35 U.S.C. 154(b) by 0 days.

(21) Appl. No.: 10/172,603

(22) Filed: Jun. 13, 2002

(51) Int. Cl.$^7$ .................................................. H01G 9/02
(52) U.S. Cl. ........................ 361/506; 361/504; 252/62.2
(58) Field of Search .................. 361/506, 505, 361/504; 252/62.2, 182.1; 29/25.03; 429/324, 339, 341, 343

(56) References Cited

U.S. PATENT DOCUMENTS

| | | | |
|---|---|---|---|
| 4,860,169 A | 8/1989 | Dapo | 361/506 |
| 5,175,674 A | 12/1992 | Dapo | 361/525 |
| 5,687,057 A * | 11/1997 | Dapo | 361/506 |
| 5,748,439 A | 5/1998 | MacFarlane et al. | 361/525 |

* cited by examiner

*Primary Examiner*—Anthony Dinkins
(74) *Attorney, Agent, or Firm*—Steven M. Mitchell

(57) ABSTRACT

The present invention is directed to a gelled electrolyte and to an electrolytic capacitor impregnated with the gelled electrolyte of the present invention for use in an implantable cardioverter defibrillator (ICD). The electrolyte gel according to the present invention is generated by the addition of a gelling agent, preferably D-mannitol, to a conventional electrolyte. The gelling agent of the present invention can be used in ethylene glycol based electrolyte systems with or without a polar organic cosolvent. Dissolved in this mixture is an aliphatic dicarboxylic acid of carbon chain length from eight to thirteen ($C_8$ to $C_{13}$) as the ionogen. In order to achieve the necessary electrolyte conductivity, an amine is added to adjust the electrolyte pH to within a range of 6–10. An amount of D-mannitol is added to the electrolyte to reach the final weight percent of 8–15% by weight of the total electrolyte mixture.

25 Claims, No Drawings

CONDUCTIVE ELECTROLYTE GEL FOR HIGH VOLTAGE ELECTROLYTIC CAPACITORS

This application is related to copending application Ser. No. 09/812,331, filed on Mar. 19, 2001.

BACKGROUND OF THE INVENTION

1. Field of the Invention

The present invention is directed to an electrolyte gel for use in electrolytic capacitors and to an electrolytic capacitor impregnated with the electrolyte gel of the present invention for use in an implantable cardioverter defibrillator (ICD).

2. Related Art

Compact, high voltage capacitors are utilized as energy storage reservoirs in many applications, including implantable medical devices. These capacitors are required to have a high energy density since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

Implantable Cardioverter Defibrillators, such as those disclosed in U.S. Pat. No. 5,131,388, incorporated herein by reference, typically use two electrolytic capacitors in series to achieve the desired high voltage for shock delivery. For example, an implantable cardioverter defibrillator may utilize two 350 to 400 volt electrolytic capacitors in series to achieve a voltage of 700 to 800 volts.

Electrolytic capacitors are used in ICDs because they have the most nearly ideal properties in terms of size, reliability and ability to withstand relatively high voltage. Conventionally, such electrolytic capacitors include an etched aluminum foil anode, an aluminum foil or film cathode, and an interposed kraft paper or fabric gauze separator impregnated with a solvent-based liquid electrolyte. While aluminum is the preferred metal for the anode plates, other metals such as tantalum, magnesium, titanium, niobium, zirconium and zinc may be used. A typical solvent-based liquid electrolyte may be a mixture of a weak acid and a salt of a weak acid, preferably a salt of the weak acid employed, in a polyhydroxy alcohol solvent. The electrolytic or ion-producing component of the electrolyte is the salt that is dissolved in the solvent. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, comprising a planar, layered, stack structure of electrode materials with separators interposed therebetween, such as those disclosed in the above-mentioned U.S. Pat. No. 5,131,388.

In an implantable cardioverter device, one concern is leakage of electrolyte from the electrolytic capacitors within the finished device. Gas buildup within a capacitor may result in leakage of the electrolyte from the capacitor, even if the capacitor is in a sealed system. The build up of gas in a capacitor can be caused by the thermal decomposition of the electrolyte, the chemical reaction of the cathode with the fill electrolyte and/or the cathodic reduction produced by the leakage current through the capacitor during manufacture and use. It is known in the art to use a cathode depolarizer to prevent the production of hydrogen gas. Picric acid has been used in low voltage applications and nitroaromatic compounds and materials such as sorbic acid, have been used in high voltage applications, as disclosed in U.S. Pat. Nos. 5,175,674 and 5,687,057. However, there remains a need in the art for an electrolyte that when impregnated into an electrolytic capacitor has reduced leakage, while maintaining a conductivity that is reasonable for use in an electrolytic capacitor.

SUMMARY OF THE INVENTION

The present invention is directed to a gelled electrolyte that when impregnated into an electrolytic capacitor, reduces the leakage of electrolyte from in between the foils and provides very reasonable conductivity with a breakdown voltage enhancement, and to an electrolytic capacitor impregnated with the gelled electrolyte of the present invention for use in an implantable cardioverter defibrillator (ICD). The electrolyte according to the present invention is an electrolyte gel that is generated by the addition of a gelling agent, preferably D-mannitol, to a conventional electrolyte. An amount of D-mannitol is added to the electrolyte to reach a final weight percent of 8–15% by weight of the total electrolyte mixture. Typically, the amount of D-mannitol necessary for gel formation also provides a boost of about 50 volts to the breakdown voltage of the electrolyte in a finished capacitor. The desired state for a gelled electrolyte is that it will remain in the gelled state at 37° C., the approximate operating temperature for an ICD, and is liquefied at a higher temperature for impregnation.

A preferred electrolyte for use with the present invention is composed of a two solvent mixture of ethylene glycol and a polar organic cosolvent, such as a polar solvent selected from the group of N-methylformamide (NMF), 2-methoxyethanol, 2-ethoxyethanol, 2-butoxyethanol, di(ethylene glycol), di(ethylene glycol) butyl ether, di(ethylene glycol) ethyl ether, propylene glycol, dimethylsulfoxide, acetonitrile, and propylene carbonate. Other combinations of mixed polar solvents can also be employed to obtain the desired results. Dissolved in this mixture is an aliphatic dicarboxylic acid, preferably of carbon chain length from eight to thirteen ($C_8$ to $C_{13}$), such as suberic, azelaic, sebacic, undecanedioic, dodecanedioic, or brassylic acid, as the ionogen. Smaller dicarboxylic acids can be used in low voltage applications. In addition, other acids such as boric acid and hypophosphorous acid can be optionally added to enhance the initial conductivity and/or final breakdown voltage. In order to achieve the necessary electrolyte conductivity, an amine, such as ammonia, dimethylamine, trimethylamine, diethylamine, triethylamine, ethanolamine, diethanolamine, triethanolamine and diisopropylethylamine, is added to adjust the electrolyte pH to within a range of about 6.0 to about 10.0. Additionally, a cathode depolarizer, or degassing agent, from the group of nitro-substituted aromatic compounds (nitroaromatics), including nitrobenzene, nitrotoluene, nitrophenol, nitroacetophenone, nitrobenzyl alcohol, and nitroanisole, can be added to reduce the amount of gas produced during capacitor life. The water content of the initial electrolyte can vary from about 1% to about 8% by weight, as determined by Karl Fischer titration. The electrolyte may be further neutralized with anhydrous ammonia to achieve a pH of about 5.5 to about 8.5, preferably about 6.5 to about 7.5.

A representative electrolyte composition according to the present invention is:

72.9% by weight ethylene glycol;

17.3% by weight n-methylformamide;

6.0% by weight azelaic acid;

1.0% by weight boric acid;

1.0% by weight 2-nitroacetophenone;

1.6% by weight ammonium hydroxide (28–30% w/w); and 0.2% by weight anhydrous ammonia.

The gelled electrolyte according to the present invention, when impregnated in an electrolytic capacitor, will not leak and will provide very reasonable conductivity with a breakdown voltage enhancement.

DETAILED DESCRIPTION OF THE INVENTION

The present invention is directed to a gelled electrolyte for use in electrolytic capacitors and to an electrolytic capacitor impregnated with the gelled electrolyte of the present invention for use in an ICD. In particular, the gelled electrolyte according to the present invention, when impregnated in an electrolytic capacitor, will not leak and will provide very reasonable conductivity with a breakdown voltage enhancement.

Preferred embodiments of the present invention are now described. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

According to the present invention, an electrolyte gel is generated by the addition of a gelling agent, D-mannitol, to a conventional electrolyte. This provides an electrolyte that does not leak from a capacitor, maintains a reasonable conductivity, and provides additional dielectric strength that allows for usage at higher voltages. An amount of D-mannitol is added to the electrolyte to reach a final weight percent of about 8.0% to about 15.0% by weight, preferably about 10.0% to about 13.0% by weight, of the total electrolyte mixture. Typically, the amount of D-mannitol necessary for gel formation will provide a boost of about 50 volts to the breakdown voltage of the electrolyte in a finished capacitor. The desired state for a gelled electrolyte is that it will remain in the gelled state at 37° C., the approximate operating temperature for an ICD, and is liquefied at some higher temperature for impregnation.

The gelling agent of the present invention can be used in ethylene glycol based electrolyte systems with or without polar organic cosolvent(s). Useful polar organic cosolvents include 2-methoxyethanol, 2-ethoxyethanol, 2-butoxyethanol, di(ethylene glycol), di(ethylene glycol) butyl ether, di(ethylene glycol)ethyl ether, propylene glycol, dimethylsulfoxide, acetonitrile, and propylene carbonate. Any combination of mixed polar solvents can be employed to obtain the desired set of solubility, viscosity, conductivity and dielectric properties. Dissolved in this mixture is an aliphatic dicarboxylic acid of carbon chain length from eight to thirteen ($C_8$ to $C_{13}$), such as suberic, azelaic, sebacic, undecanedioic, dodecanedioic, or brassylic acid, as the ionogen. Smaller dicarboxylic acids can be used in low voltage applications. In addition, other acids such as boric acid and hypophosphorous acid can be optionally added to enhance the initial conductivity or final breakdown voltage. Also, in order to achieve the necessary electrolyte conductivity, an amine such as ammonia, dimethylamine, trimethylamine, diethylamine, triethylamine, ethanolamine, diethanolamine, triethanolamine and diisopropylethylamine is added to adjust the electrolyte pH to within a range of about 6 to about 10. Additionally, a cathode depolarizer, or degassing agent, from the group of nitro-substituted aromatic compounds (nitroaromatics), including nitrobenzene, nitrotoluene, nitrophenol, nitroacetophenone, nitrobenzyl alcohol, and nitroanisole, can be added to reduce the amount of gas produced during capacitor life.

The electrolyte composition can be composed of the following range of components: about 45.0% to about 85% by weight ethylene glycol, about 5.0% to about 45% by weight of a polar organic cosolvent, about 4.0% to about 15% by weight of an aliphatic dicarboxylic acid of carbon chain length from eight to thirteen ($C_8$ to $C_{13}$), about 0.0% to about 5.0% by weight boric acid, about 0.0% to about 0.1% by weight hypophosphorous acid, about 0.5% to about 4.0% by weight of a nitro-substituted aromatic compound as a degassing agent, and about 1.0% to about 10.0% by weight of ammonia and/or an amine. The water content of the initial electrolyte can vary from about 1% to about 8% by weight, as determined by Karl Fischer titration.

A representative composition according to the present invention that displays the desired properties is: 72.9% by weight ethylene glycol, 17.3% by weight N-methylformamide, 6.0% by weight Azelaic acid, 1.0% by weight boric acid, 1.0% by weight 2-Nitroacetophenone, 1.6% by weight ammonium hydroxide (28–30% w/w). The electrolyte may be further neutralized with anhydrous ammonia to achieve a pH of about 5.5 to about 8.5, preferably about 6.5 to about 7.5. An amount of D-mannitol is then added to the electrolyte to reach the final weight percent of about 8.0% to about 15.0% by weight, more preferably about 10.0% to about 13.0% by weight, of the total electrolyte mixture.

A capacitor with the above electrolyte, with an addition of D-mannitol to achieve 12% by weight D-mannitol to 88% by weight electrolyte solution was impregnated into several capacitors and showed no significant gain in equivalent series resistance (ESR), while maintaining high capacitance utilization at an operating voltage of 400 volts and a breakdown voltage of between 450V and 520V. Accordingly, a capacitor impregnated with the gelled electrolyte of the present invention may be used in a capacitor with a working voltage of greater than 400V, preferably between 400V and 450V, without leakage. In comparing 120 Hz bridge capacitance to energy discharge measurements, it has been observed that an ESR below 2.5Ω using the 120 Hz bridge measurements corresponds to an acceptable discharge efficiency (stored energy to delivered energy ratio). Capacitors using a two anode per layer construction, impregnated with the gelled electrolyte of the present invention, showed an acceptable ESR below 2.5Ω, and in several instances below 2.0Ω, using the 120 Hz bridge measurement.

An electrolytic capacitor according to the present invention is constructed of anode and cathode layers, stacked with a paper insulator or spacer between each layer. The anode layer is composed of one or more anode foils stacked together without any paper spacer, to form a high energy density anode element. The anode and cathode layers are then grouped together in a parallel connection to produce sufficient capacitance for the intended function. This finished stack is inserted into a case with a geometry closely following the contour of the stack, and designed to minimize the space occupied inside the finished defibrillator.

Aluminum foil is preferred for the anode and cathode layers, because of its ability to produce a sufficient quality oxide layer, its conductive properties, and its wide commercial availability. Other valve metal foils conventionally utilized in electrolytic capacitors can also be used, including titanium, tantalum, magnesium, niobium, zirconium and zinc. Preferably, a strip of unetched, high purity (99.99%) aluminum foil with high cubicity, wherein at least 85% of the crystalline aluminum structure is oriented in a normal position (i.e., a (1,0,0) orientation) relative to the surface of the foil, is used. Such foils are well-known in the art and are readily available from commercial sources known to those skilled in the art.

The anode foil may be etched in an aqueous halide based etch solution, typically a hydrochloric acid or sodium chloride solution, according to a conventional etch process; for example, U.S. Pat. No. 5,715,133 describes a suitable method of etching foil and is incorporated herein by reference in its entirety. The etch solution preferably consists of about 1.3% by weight sodium chloride, about 3.5% by weight sodium perchlorate, about 0.35% sodium persulfate, and deionized water. The etch solution preferably is heated to about 60° C. to about 95° C., more preferably 85° C. The foil is etched at a DC current density of about 0.01 A/cm$^2$ to about 0.30 A/cm$^2$, preferably 0.15 A/cm$^2$. A charge of 20 to 100 coulombs per cm$^2$ is passed through the foil during the etching process, with about 50 coulombs/cm$^2$ preferred, which requires a time of about 2 minutes and 13 seconds to about 11 minutes and 7 seconds, with about 5 minutes and 30 seconds preferred.

The foil is then removed from the etch solution and rinsed in deionized water. Then the tunnels formed during the initial etch are widened, or enlarged, in a secondary etch solution, typically an aqueous based nitrate solution, preferably between about 1% to about 20% aluminum nitrate, more preferably between about 10% to about 14% aluminum nitrate, with less than 1% free nitric acid. The etch tunnels are widened to an appropriate diameter by methods known to those in the art, such as that disclosed in U.S. Pat. Nos. 4,518,471 and 4,525,249, entirely incorporated herein by reference.

After the etch tunnels have been widened, the foil is again rinsed with deionized water and dried. Finally, a barrier oxide layer may be formed onto one or both surfaces of the metal foil by placing the foil into an electrolyte bath and applying a positive voltage to the metal foil and a negative voltage to the electrolyte. The barrier oxide layer provides a high resistance to current passing between the electrolyte and the metal foils in the finished capacitor, also referred to as the leakage current. A high leakage current can result in poor performance and reliability of an electrolytic capacitor. In particular, a high leakage current results in greater amount of charge leaking out of the capacitor once it has been charged.

The formation process consists of applying a voltage to the foil through an electrolyte such as boric acid and water or other solutions familiar to those skilled in the art, resulting in the formation of an oxide on the surface of the anode foil. The preferred electrolyte for formation is a 100–1000 $\mu$S/cm, preferably 500 $\mu$S/cm, citric acid concentration. In the case of an aluminum anode foil, the formation process results in the formation of aluminum oxide ($Al_2O_3$) on the surface of the anode foil. The thickness of the oxide deposited or "formed" on the anode foil is proportional to the applied voltage, roughly 10 to 15 Angstroms per applied volt.

The etched and formed anode foils are cut and the capacitor assembled as discussed above. An electrolytic capacitor stack according to the present invention consists of a number of units of: cathode, a paper spacer, one or more anodes, a paper spacer and cathode; with neighboring units sharing the cathode between them.

The electrolyte of the present invention is then prepared. First, the conventional electrolyte is prepared, as would be apparent to one of skill in the relevant art. In one embodiment of the present invention, initially, ethylene glycol and a polar organic cosolvent selected from the group of N-methylformamide (NMF), 2-methoxyethanol, 2-ethoxyethanol, 2-butoxyethanol, di(ethylene glycol), di(ethylene glycol)butyl ether, di(ethylene glycol)ethyl ether, propylene glycol, dimethylsulfoxide, acetonitrile, and propylene carbonate, are mixed and heated. Other combinations of mixed polar solvents can also be employed to obtain the desired results. During heating, at about 60° C. to about 100° C., preferably 90° C., boric acid and an aliphatic dicarboxylic acid of carbon chain length from eight to thirteen ($C_8$ to $C_{13}$), such as suberic, azelaic, sebacic, undecanedioic, dodecanedioic, or brassylic acid, as the ionogen, are added to the solution and dissolved. Smaller dicarboxylic acids can be used in low voltage applications. The solution is then heated to 120° C. and held at about 120° C. to about 130° C. for one hour. After heating, a nitro-substituted aromatic compound (nitroaromatic), including nitrobenzene, nitrotoluene, nitrophenol, nitroacetophenone, nitrobenzyl alcohol, and nitroanisole, can be added as a degassing agent and the solution is allowed to cool to room temperature. An amine including ammonia, dimethylamine, trimethylamine, diethylamine, triethylamine, ethanolamine, diethanolamine, triethanolamine and diisopropylethylamine, is then added to adjust the electrolyte pH to within a range of about 6 to about 10, in order to achieve the necessary electrolyte conductivity. The water content of the initial electrolyte can vary from about 1% to about 8% by weight, as determined by Karl Fischer titration. The electrolyte may be further neutralized with anhydrous ammonia to achieve a pH of about 5.5 to about 8.5, preferably about 6.5 to about 7.5.

An amount of D-mannitol is then added to the electrolyte to reach the final weight percent of about 8.0% to about 15.0% by weight, preferably about 10.0% to about 13.0% by weight, of the total electrolyte mixture. The solution is heated to fully dissolve the added D-mannitol and the solution is subsequently cooled to room temperature. The desired state for a gelled electrolyte is that it will remain in the gelled state at 37° C., the approximate operating temperature for an ICD, and is liquefied at some higher temperature for impregnation. This affords the greatest manufacturability and usefulness in product. A gelled electrolyte with 8–15% D-mannitol becomes liquid at nearly the desired 37° C. operating temperature. The desired gel forms in about 4 hours to about 6 hours and is highly dependent on concentration. The gel can then be heated to return to a liquid state, the transition temperature being governed by D-mannitol composition. At this point, the electrolyte can be impregnated into a capacitor with appropriate anodes, cathodes and paper spacers and then can be aged with no significant changes in the aging profile.

The pre-assembled capacitor is vacuum impregnated with the electrolyte of the present invention, by placing the capacitor in contact with the electrolyte and reducing the pressure to less than 50 cm Hg. The capacitor is held at this low pressure for about 5 minutes to about 45 minutes with a preferred time of 15 minutes, and then pressure is restored, using the pressure to force the electrolyte mixture into the capacitor stack. The capacitor is then removed and placed in an oven at a temperature of about 65° C. to about 90° C. with a preferred temperature of 90° C. and a maximum oxygen atmospheric concentration of 2% for a period of about 2 hours to about 24 hours, with a preferred time of 4 hours. The capacitor is then aged in a normal manner by applying the working voltage to the capacitor, allowing the capacitor to reach this voltage, and then allowing the current to decrease.

Electrolytic capacitors according to the present invention can be incorporated into implantable medical devices, such as implantable cardioverter defibrillators (ICDs), as would be apparent to one skilled in the art, as described in U.S. Pat. No. 5,522,851.

Having now generally described the invention, the same will be more readily understood through reference to the following examples, which are provided by way of illustration, and are not intended to be limiting of the present invention.

EXAMPLES

Example 1

An electrolyte was prepared having the following formulation:

| | |
|---|---|
| Ethylene Glycol | 616.1 g |
| N-methylformamide | 146.6 g |
| Azelaic Acid | 51.0 g |
| Boric Acid | 8.5 g |
| 2-Nitroacetophenone | 8.5 g |
| Ammonia (aq) | 13.5 g |

The solvents were mixed in a 1L beaker. The mixture was then heated to 85° C., the acids were added. The solution temperature was raised to 100° C., and held at 100–110° C. for 1 hour. When the solution temperature reached 95° C., the nitroacetophenone was added. Upon dissolution, the solution was removed from the hot plate and allowed to cool. The ammonia was then added. The solution has a pH (30.5° C.) of 6.21 and a conductivity of 2.81 mS/cm. Anhydrous ammonia was added to further neutralize the solution to a final pH (36.4° C.) of 6.99 and a conductivity of 5.22 mS/cm.

Varying amounts of D-mannitol were added to the electrolyte mixture as shown in the table below. The samples were mixed, heated to dissolve the D-mannitol and allowed to cool. A gelled electrolyte was formed with the addition of 12% by weight D-mannitol and 14% by weight D-mannitol.

| Electrolyte (g) | D-mannitol (g) | Gel Formation |
|---|---|---|
| 100 | 8.7 | No |
| 100 | 11.1 | No |
| 100 | 13.6 | Yes |
| 100 | 16.3 | Yes |

A capacitor impregnated with the 12% by weight D-mannitol gelled electrolyte exhibited a capacitance of 161.06 μF and an ESR of 1.194Ω (at 120 Hz and 37° C.)

Comparative Example 1

An electrolyte was prepared, as discussed above with respect to Example 1, having the following formulation by weight:

| | |
|---|---|
| Ethylene Glycol | 90.6% |
| Azelaic Acid | 6.6% |
| Boric Acid | 1.0% |
| 3-Nitroacetophenone | 1.0% |
| Ammonium Hydroxide (30% w/w) | 1.4% |
| Anhydrous ammonia | ~0.2% |

47.5 g of the electrolyte mixture and 2.6 g D-mannitol were placed in a 200 mL beaker and heated, while stirring. The solution reached a temperature of 97° C., at which time the D-mannitol was completely dissolved. The hot plate was turned off and the solution was allowed to cool. The solution appeared to thicken, but not significantly. An additional 2.8 g of D-mannitol was added and the solution was heated until all of the D-mannitol was dissolved. The solution cooled to a white paste.

Comparative Example 2

An electrolyte was prepared, as discussed above with respect to Example 1, having the following formulation by weight:

| | |
|---|---|
| Ethylene Glycol | 90.6% |
| Azelaic Acid | 6.6% |
| Boric Acid | 1.0% |
| 3-Nitroacetophenone | 1.0% |
| Ammonium Hydroxide (30% w/w) | 1.4% |
| Anhydrous ammonia | ~0.2% |

47.6 g of the electrolyte mixture and 2.5 g D-mannitol were placed in a 200 mL beaker and heated, while stirring, until D-mannitol dissolved. After cooling, no gelling was observed.

Example 2

An electrolyte was prepared, as described above with respect to Example 1, having the following formulation by weight:

| | |
|---|---|
| Ethylene Glycol | 90.6% |
| Azelaic Acid | 6.0% |
| Boric Acid | 1.0% |
| 3-Nitroacetophenone | 1.0% |
| Ammonium Hydroxide (30% w/w) | 1.2% |
| Anhydrous ammonia | ~0.2% |

Varying amounts of the electrolyte mixture and D-mannitol were placed in a 200 mL beaker and heated, while stirring, as shown in the table below. The samples were mixed, heated to dissolve the D-mannitol and allowed to cool. A gelled electrolyte was formed with a mixture of 90% electrolyte and 10% D-mannitol.

| Electrolyte (g) | D-mannitol (g) | Gel Formation |
|---|---|---|
| 47.5 | 2.5 | No |
| 47.0 | 3.0 | No |
| 46.5 | 3.5 | No |
| 46.0 | 4.0 | No |
| 45.5 | 4.5 | No |
| 45.0 | 5.0 | Yes |

After forming the 90% electrolyte and 10% D-mannitol gelled electrolyte, 4.9 g of the electrolyte were re-heated to test the reversibility characteristics. The heated electrolyte melted, returning to the gelled electrolyte to its liquid state.

Example 3

An electrolyte was prepared having the following formulation:

| | |
|---|---|
| Ethylene Glycol | 326.2 g |
| N-methylformamide | 77.6 g |
| Azelaic Acid | 27.0 g |
| Boric Acid | 4.5 g |
| 2-Nitroacetophenone | 4.5 g |
| Ammonia (aq) | 7.2 g |

The solvents were mixed in a 600 mL beaker and heated with stirring to 65° C., when the acids were added. The solution temperature was raised to 100° C., and held at 100–110° C. IC for 1 hour. The solution was allowed to cool to below 95° C., and the nitroacetophenone was added. Upon dissolution, the solution was removed from the hot plate and allowed to cool. Aqueous ammonia was then added. The solution had a pH (43.8° C.) of 6.32 and a conductivity of 4.82 mS/cm. Anhydrous ammonia was then added to further neutralize the solution to a final pH (44.3° C.) of 6.99, with a conductivity of 7.44 mS/cm and a Karl Fischer titration (water content) measurement of 5.90%.

Next, 100 g of the electrolyte were mixed with 13.6 g D-mannitol in a 200 mL beaker. The mixture was heated until the D-mannitol was dissolved. A capacitor impregnated with the D-mannitol gelled electrolyte exhibited a capacitance of 162.31 μF and an ESR of 1.526Ω (at 120 Hz and 35.5° C.).

Similarly, 100 g of the electrolyte were mixed with 16.3 g D-mannitol in a 200 mL beaker. The mixture was heated until the D-mannitol was dissolved. A capacitor impregnated with the D-mannitol gelled electrolyte exhibited a capacitance of 165.12 μF and an ESR of 1.630Ω (at 120 Hz and 36.8° C.).

The electrolyte without the addition of D-mannitol exhibited a breakdown voltage (37.6° C.) of 435 V and a conductivity of 6.34 mS/cm. After the addition of 13.6 g D-mannitol, the electrolyte exhibited a breakdown voltage (36.5° C.) of 475 V, a breakdown voltage enhancement of 40 V.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Additionally, all references cited herein, including journal articles or abstracts, published or corresponding U.S. or foreign patent applications, issued U.S. or foreign patents, or any other references, are each entirely incorporated by reference herein, including all data, tables, figures, and text presented in the cited references.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A conductive electrolyte gel for high voltage electrolytic capacitors, comprising:
    ethylene glycol;
    an aliphatic dicarboxylic acid of carbon chain length from eight to thirteen ($C_8$ to $C_{13}$);
    an amine; and
    D-mannitol in an amount effective to form an electrolyte gel.

2. An electrolyte according to claim 1, wherein said D-mannitol is present at a final weight percent of about 8% to about 15% by weight of the total electrolyte mixture.

3. An electrolyte according to claim 1, further comprising a polar organic cosolvent, selected from the group consisting of n-methylformamide, 2-ethoxyethanol, 2-methoxyethanol, 2-butoxyethanol, di(ethylene glycol), di(ethylene glycol) butyl ether, di(ethylene glycol)ethyl ether, propylene glycol, dimethylsulfoxide, acetonitrile and propylene carbonate.

4. An electrolyte according to claim 1, wherein said an aliphatic dicarboxylic acid of carbon chain length from eight to thirteen ($C_8$ to $C_{13}$) is selected from the group consisting of suberic acid, azelaic acid, sebacic acid, undecanedioic acid, dodecanedioic acid and brassylic acid.

5. An electrolyte according to claim 1, wherein said amine is selected from the group consisting of ammonia, dimethylamine, trimethylamine, diethylamine, triethylamine, ethanolamine, diethanolamine, triethanolamine and diisopropylethylamine.

6. An electrolyte according to claim 1, further comprising boric acid.

7. An electrolyte according to claim 1, further comprising hypophosphorous acid.

8. An electrolyte according to claim 1, further comprising a cathode depolarizer.

9. An electrolyte according to claim 8, wherein said cathode depolarizer is a nitro-substitute aromatic compound.

10. An electrolyte according to claim 9, wherein said nitro-substituted aromatic compound is selected from the group consisting of nitrobenzene, nitrotoluene, nitrophenol, nitroacetophenone, nitrobenzyl alcohol and nitroanisole.

11. An electrolyte according to claim 1, wherein said electrolytic capacitor has a working voltage of greater than 400V.

12. A conductive electrolyte for high voltage electrolytic capacitors, comprising ethylene glycol, n-methylformamide, azelaic acid, boric acid, 2-nitroacetophenone, ammonium hydroxide and D-mannitol in an amount effective to form an electrolyte gel.

13. An electrolyte according to claim 12, wherein said D-mannitol is added to the electrolyte to reach a final weight percent of about 8% to about 15% by weight of the total electrolyte mixture.

14. An electrolyte according to claim 12, comprising about 45.0% to about 85% by weight ethylene glycol, about 5.0% to about 45% by weight n-methylformamide, about 4.0% to about 15% by weight azelaic acid, about 0.0% to about 5.0% by weight boric acid, about 0.5% to about 4.0% by weight 2-nitroacetophenone and 1.0% to about 10.0% ammonium hydroxide.

15. An electrolyte according to claim 12, comprising 72.9% by weight ethylene glycol, 17.3% by weight n-methylformamide, 6.0% by weight azelaic acid, 1.0% by weight boric acid, 1.0% 2-nitroacetophenone, 1.6% by weight ammonium hydroxide (28–30% solution in water) and 0.2% by weight anhydrous ammonia.

16. An electrolytic capacitor impregnated with the conductive electrolyte gel of claim 1.

17. An electrolytic capacitor impregnated with the conductive electrolyte gel of claim 12.

18. An implantable cardioverter defibrillator (ICD) comprising an electrolytic capacitor impregnated with the conductive electrolyte gel of claim 1.

19. An implantable cardioverter defibrillator (ICD) comprising an electrolytic capacitor impregnated with the conductive electrolyte gel of claim 12.

20. A method of making a conductive electrolyte gel for high voltage electrolytic capacitors, comprising:

(1) mixing an ethylene glycol solvent with an aliphatic dicarboxylic acid of carbon chain length from eight to thirteen ($C_8$ to $C_{13}$) to form a first solution;

(2) adding an amine to said solution to neutralize the pH of said solution; and (3) adding D-mannitol to said solution in an amount effective to form an electrolyte gel.

21. A method according to claim 20 further comprising the step of:

(4) adding a hypophosphorous acid.

22. A method according to claim 20 further comprising the step of:

(4) adding a cathode depolarizer.

23. A method according to claim 20 further comprising the step of:

(4) adding boric acid.

24. A method according to claim 20, wherein step (2) achieves a final pH of said solution of about 6.0 to about 10.0.

25. A method according to claim 20, wherein step (2) achieves a final pH of said solution of about 6.5 to about 7.5.

* * * * *